No. 780,123. PATENTED JAN. 17, 1905.
J. A. NELSON.
INSECT DESTROYER.
APPLICATION FILED MAY 31, 1904.
2 SHEETS—SHEET 1.
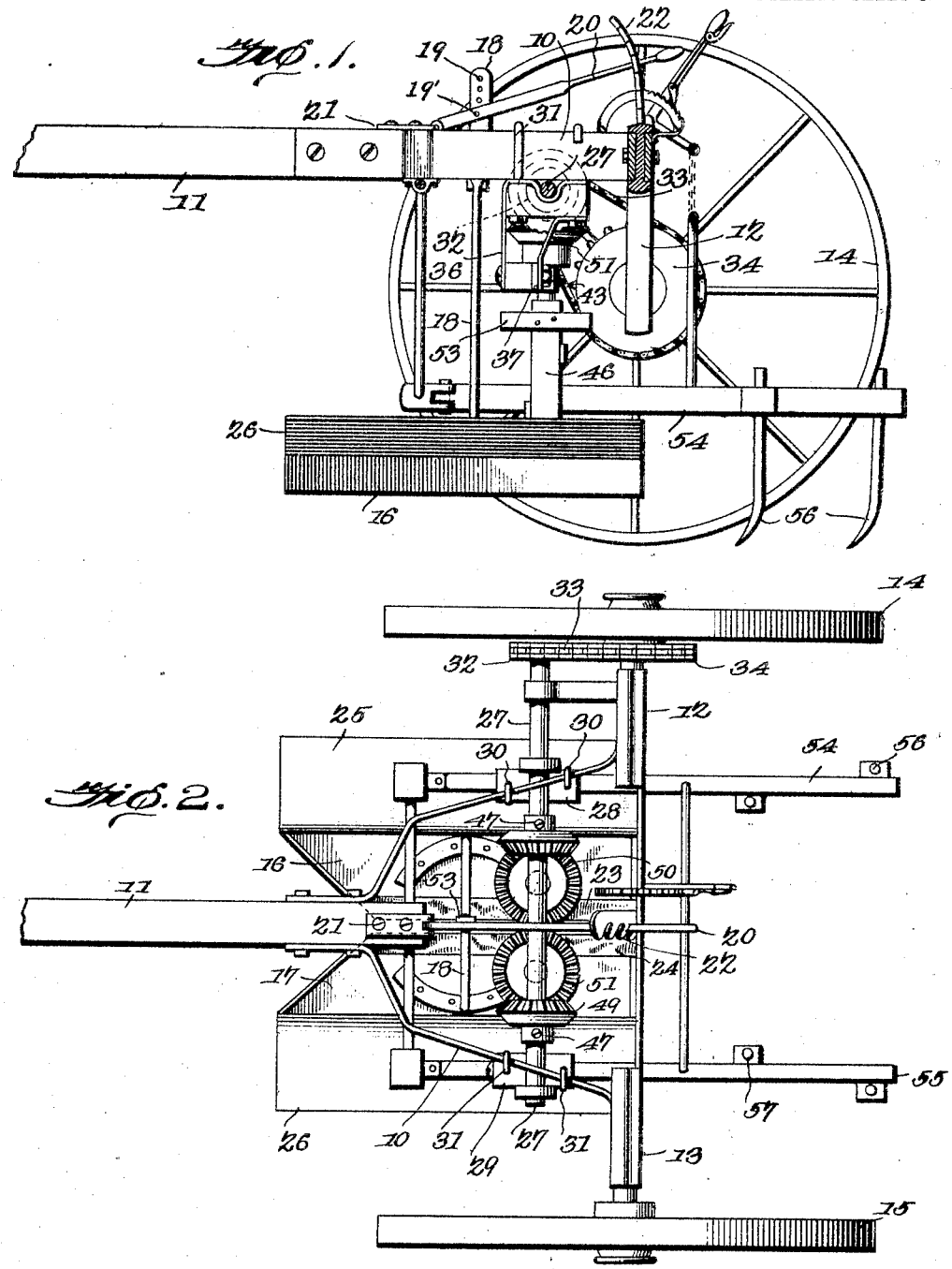

No. 780,123. PATENTED JAN. 17, 1905.
J. A. NELSON.
INSECT DESTROYER.
APPLICATION FILED MAY 31, 1904.

2 SHEETS—SHEET 2.

Witnesses
E. F. Stewart
C. N. Woodward

John A. Nelson
Inventor
by C. A. Snow & Co
Attorneys

No. 780,123. Patented January 17, 1905.

UNITED STATES PATENT OFFICE.

JOHN A. NELSON, OF ROUNDROCK, TEXAS.

INSECT-DESTROYER.

SPECIFICATION forming part of Letters Patent No. 780,123, dated January 17, 1905.

Application filed May 31, 1904. Serial No. 210,559.

*To all whom it may concern:*

Be it known that I, JOHN A. NELSON, a citizen of the United States, residing at Roundrock, in the county of Williamson and State of Texas, have invented a new and useful Insect-Destroyer, of which the following is a specification.

This invention relates to devices for detaching insects, worms, and parasites of various kinds from growing plants, and has for its object to produce a simply-constructed, easily-operated, and efficient implement of this character by means of which the injurious insects, worms, and other forms of parasites may be removed from the plants and destroyed without injury to the plants.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

Figure 3:
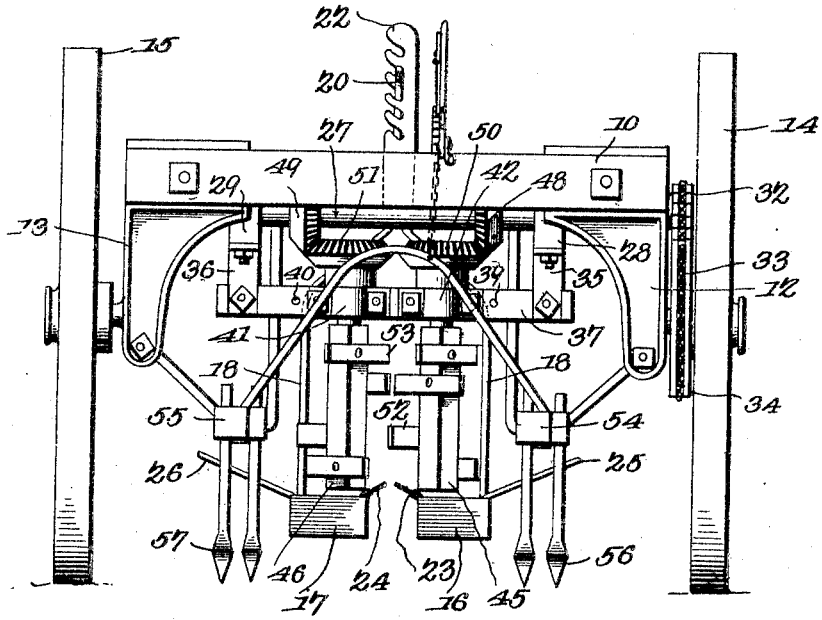
Figure 4:
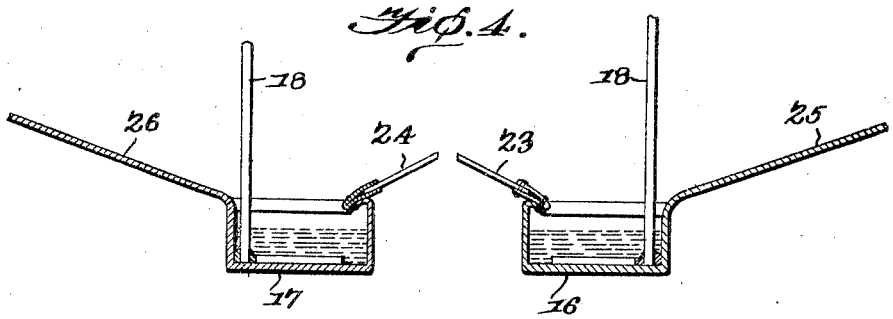

In the drawings thus employed, Figure 1 is a side elevation, partially in section. Fig. 2 is a plan view, and Fig. 3 is a rear elevation. Fig. 4 is an enlarged transverse section of the combined receivers and straps.

The device herein described is designed for attachment to the frame of an ordinary cultivator or similar implement having a supporting-frame, draft-tongue, and bearing-wheels and may be readily adapted for attachment to any of the various forms of such implements manufactured by making slight and immaterial modifications in the coupling means and for the purpose of illustration is shown attached to a conventional structure of this character in which the supporting-frame 10 is provided with the draft-tongue 11 and stub-axle brackets 12 13 for the bearing-wheels 14 15.

Suspended beneath the frame 10 are two receptacles 16 17 for containing a supply of insect-destroying liquid, such as kerosene-oil floating on water or the like.

Attached to the receptacle is an arch-frame 18, having spaced apertures 19 in its united upper part, by means of which it may be pivotally united to a lever-arm 20, as by a bolt 19', one end of the lever pivoted by clip 21 to the rear of the tongue 11 and the other end for adjustable engagement with a notched bar 22, supported from the rear portion of the frame 10. By this means it is obvious that the receptacle may be adjusted vertically to any required extent.

The receptacle will be spaced apart for movement upon opposite sides of the plants from which the insects are to be removed and will be provided with inwardly-projecting inclined flexible members 23 24, of rubber, leather, or the like, to closely engage the stalks of the plants without injury to the same, and thus insure the catching of all falling insects and their deposit in the receptacles. The receptacles are also provided with outwardly-extending inclined gather-wings 25 26 to extend the area of the receptacles and insure the gathering of all the insects which may be shaken from the plants.

A transverse shaft 27 is supported for rotation in bearings 28 29, suspended by clips 30 31 from beneath the frame member 10 and having at one end a chain-pinion 32 for engagement by a chain 33, leading from a chain-wheel 34 on the bearing-wheel 14, by which means the shaft is rotated by the movement of the bearing-wheels over the ground.

Suspended, as by hangers 35 36, from the bearings 28 29 is a plate 37, having a plurality of spaced apertures 39 40, by means of which bearings 41 42 may be adjustably secured, as by bolts, to the plate. The bearings support shafts 45 46 for rotation in a vertical position and adjustable longitudinally of the plate 37 by setting the bolts at the bearings 42 43 in the apertures 39 40, as will be obvious.

Mounted for rotation upon the shaft 27, but movable longitudinally of the same, and secured thereto by set-screws 47 are two bevel-gears 48 49 for engaging similar bevel-gears 50 51 on the vertical shafts 45 46. By this arrangement when the shafts 45 46 are adjusted longitudinally of the plate 37, as above noted, the bevel-gears 48 49 will be correspondingly moved along the shaft 27, so that the gears will retain their proper operative relations at all points in the adjustments.

The shafts 45 46 are provided, respectively, with spaced radiating arms 52 53, of flexible material, such as leather, which will strike the plants from opposite sides as the device is drawn forward and the vertical shafts rapidly revolved through the action of the connecting chain, shaft, and gears.

The vertical shafts traveling in opposite directions cause the flexible members 52 53 to rapidly strike the plants as they are drawn past them and dislodge the adhering insects and throw them into the receptacles, where they are destroyed by the liquid therein.

When the receptacles are fully charged with the detached insects, they can be easily removed by simply releasing the single bolt 19' and the insects disposed of by burning or otherwise, the receptacles recharged with the destroying liquid, and the gathering action repeated, and so on as often as necessary.

If required, the cultivator-beams of the implement, represented at 54 55, with their cultivator-hoes 56 57 attached, may be connected for operation in the rear of the receptacles 16 17 to cover any of the insects which perchance escape the receptacles and fall to the ground, and thus destroy them and prevent their return to the plants.

Certain kinds of parasites which infest certain kinds of plants if covered by the soil will be destroyed, and the cultivator-hoes may be employed in this connection to advantage.

The device thus constructed will be found very efficient for detaching and destroying many forms and species of insects, worms, and other kinds of parasites which infest growing plants without injury to the plants, but is more particularly applicable to the cotton-plant for the removal and destruction of the boll-weevil and kindred pests, and will also effectually detach any of the bolls which have been stung by the insects, and thereby rendered easily detachable by the blows of the flexible members 52, and deposited in the receptacle for destruction with the gathered insects.

Having thus described the invention, what is claimed is—

1. In an insect-destroyer, two receptacles for a destroying liquid and spaced apart for movement at opposite sides of the plants, and spaced vertical shafts mounted for reverse rotation above the respective receptacles and each provided with a plurality of spaced flexible arms radially disposed for striking the plants from opposite sides in the direction of the receptacles.

2. In an insect-destroyer, two receptacles for containing destroying liquid and spaced apart for movement at opposite sides of the plants and provided with flexible guards upon their adjacent faces for engagement with the plants, and spaced vertical shafts mounted for reverse rotation above the respective receptacles and each provided with a plurality of radially-disposed flexible arms for striking the plants from opposite sides in the direction of the receptacles.

3. In an insect-destroyer, the combination with a wheeled frame, of a pair of devices to strike the plants and dislodge insects therefrom, said devices being hung from the frame and spaced to travel at opposite sides of a row of plants, means for adjusting said devices to vary the space therebetween, receptacles hung beneath said devices to collect the insects dislodged thereby, and means for vertically adjusting the receptacles.

4. In an insect-destroyer, two receptacles for a destroying liquid and spaced apart for movement at opposite sides of the plants and with inclined gather-wings extending from their outer walls, and spaced vertical shafts mounted for reverse rotation above the respective receptacles and each provided with a plurality of spaced flexible arms radially disposed for striking the plants from opposite sides in the direction of the receptacles.

5. In an insect-destroyer, two receptacles for containing destroying liquid and spaced apart for movement at opposite sides of the plants and provided with flexible guards upon their adjacent faces for engagement with the plants, said receptacles having inclined gather-wings extending from their outer walls, and spaced vertical shafts mounted for reverse rotation above the respective receptacles and each provided with a plurality of radially-disposed flexible arms for striking the plants from opposite sides in the direction of the receptacles.

6. In an insect-destroyer, two receptacles for a destroying liquid spaced apart and having means for adjustable connection to a supporting-frame for movement at opposite sides of the plants, a transverse frame having means for attachment to said supporting-frame, shafts mounted for vertical rotation upon said transverse frame above said receptacles and each provided with a plurality of spaced flexible arms radially disposed for striking the plants from opposite sides in the direction of the receptacles.

7. In an insect-destroyer, a supporting-frame mounted for movement upon bearing-wheels, two receptacles for containing destroying liquid suspended for vertical adjustment from said supporting-frame for movement with the same upon opposite sides of the plants, a transverse frame carried by said supporting-frame, spaced vertical shafts mounted for rotation upon said transverse frame and provided with radially-disposed flexible arms, a transverse shaft mounted for rotation upon the supporting-frame and adapted to be driven from said bearing-wheels, and means for communicating the motion from said transverse shaft to said vertical shafts.

8. In an insect-destroyer, a supporting-frame mounted for movement upon bearing-wheels, two receptacles for containing destroying liquid suspended for vertical adjustment from said supporting-frame for movement with the same upon opposite sides of the plants, a transverse frame carried by said supporting-frame, spaced vertical shafts mounted for rotation upon said transverse frame and adjustable longitudinally of the same, said shafts having beveled operating-pinions and provided with radially-disposed flexible arms, a transverse shaft mounted for rotation upon the supporting-frame and adapted to be driven from said bearing-wheels, and beveled gears rotative with said shaft and slidable longitudinally of the same and engaging the bevel-pinions on said vertical shafts.

9. In an insect-destroyer, a supporting-frame mounted for movement upon bearing-wheels, two receptacles for containing destroying liquid suspended for vertical adjustment from said supporting-frame for movement with the same upon opposite sides of the plants, spaced vertical shafts mounted for rotation relative to said supporting-frame and each provided with a plurality of radially-disposed flexible arms, means for rotating said vertical shafts from said bearing-wheels, and means located in rear of the receptacles for covering over with soil the insects which escape the receptacles.

In testimony that I claim the foregoing as my own I have hereto affixed my signature in the presence of two witnesses.

JOHN A. NELSON.

Witnesses:
   E. W. SWENSON,
   H. H. HAUFF.